UNITED STATES PATENT OFFICE.

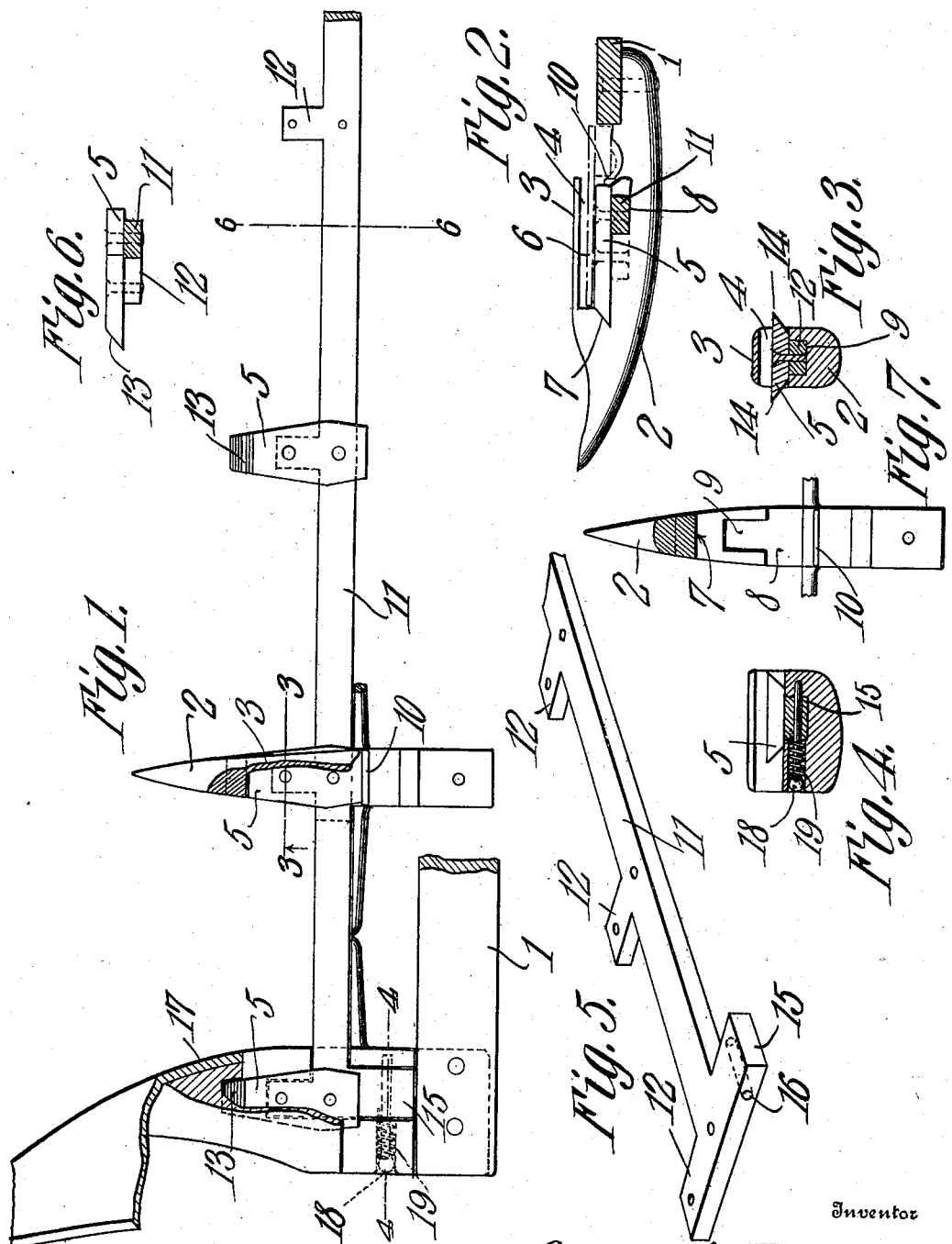

OSCAR C. TURNER, OF HIAWATHA, KANSAS.

CUTTER-BAR FOR HARVESTING-MACHINES.

No. 889,646.   Specification of Letters Patent.   Patented June 2, 1908.

Application filed October 4, 1907. Serial No. 395,946.

*To all whom it may concern:*

Be it known that I, OSCAR C. TURNER, a citizen of the United States, residing at Hiawatha, in the county of Brown and State of Kansas, have invented a new and useful Cutter-Bar for Harvesting-Machines, of which the following is a specification.

This invention relates to cutter bars for mowing and harvesting machines, and the like, and has for its object to provide a simple and effective means for securing the ledger-plates to guard fingers of mowing and harvesting machines in such a manner that while made removable for the purpose of sharpening and repairs, they will be held rigidly in their seats when the machine is in action.

With this and other objects in view, the invention comprises the various novel features of construction and arrangement of parts, to be hereinafter more fully described, and pointed out particularly in the appended claims.

In the accompanying drawings:—Figure 1 is a plan view of a portion of a cutter-bar for mowing and harvesting machines, portions of the same being broken away to more clearly illustrate the invention. Fig. 2 is a side view of one of the guard fingers showing the invention applied, portions of this figure being in section. Fig. 3 is a cross section of one of the guard fingers on the line 3—3 of Fig. 1. Fig. 4 is a cross section of the outer shoe on the line 4—4 of Fig. 1. Fig. 5 is a perspective view of one end of the ledger-plate bar. Fig. 6 is a cross sectional view on the line 6—6 of Fig. 1. Fig. 7 is a top plan view of a guard finger partly broken away.

Corresponding parts in the several figures are indicated throughout by similar characters of reference.

The numeral 1 indicates the finger-bar of a mowing or harvesting machine on which the guard fingers 2 are rigidly secured at their rear ends by bolts or rivets in the usual manner. As these guard fingers and their appurtenances are alike, the description hereafter will be confined to one of them.

The guard finger 2 has the usual cover plate 3 below which is a slot 4 for a ledger plate 5 and the movable knives 6. The forward end of the recess for the width of the guard finger has at its bottom an undercut recess 7 a short distance in the rear of which is a transverse groove 8. Extending forwardly from said groove is a rectangular recess 9 disposed in the center line of the guard finger. The rear wall of the groove 8 extends a short distance above the level of the floor of the slot 4 to form a rib 10 extending transversely of the guard finger.

The ledger plate 5 of each guard finger is riveted to a bar 11 which extends the full length of the cutting mechanism and is provided with forwardly extending lugs 12 beneath each ledger plate. The forward end of the ledger plate has a downward inclination 13 which when in position on the guard finger enters the undercut recess 7. The upper sides of the ledger plates are made smooth so as to coact with the movable knives on the sickle bar. The edges of the ledger plates in front of the bar 11 are inclined downwardly to form cutting edges 14 between which edges and the movable knives grass and grain are cut.

Each end of the ledger-plate bar 11 has a rearward projection 15 provided with a horizontal perforation 16 parallel with the said bar. At the outer end of the ledger-plate bar 11 the forward and rearward projections 12 and 15, respectively, are seated in depressions formed in the grain shoe 17 and held there by a pin 18 seated in holes formed in the shoe and in the hole 16 in the bar 11. A spring 19 surrounds the pin and by its contraction holds the pin in place.

The ledger-plate bar is placed in position by first inserting the tapered ends 13 of the ledger-plate into the undercut recesses 7 in the guard finger, after which the bar 11 is dropped into the grooves 8 of the finger and the lugs 12 seat themselves in the recesses 9. The pin 18 during this operation has been partly withdrawn from its seat, but after the ledger-plate bar becomes seated the pin is loosened and is pulled into its normal position by the spring 19. It will thus be seen that the ledger-plates are securely fastened to the guard finger, the lateral movement being prevented by the lugs 12 which are seated in the recesses 9, vertical movement is restrained by the movable knives above them and, between the undercut recess, the rib 10 and the groove 8, all tendency to forward and rearward movement is prevented.

From the above, it will be noted that the invention is simple, cheap and convenient, all the ledger-plates being capable of a quick removal from the guard fingers for sharpening or repair and as quickly restored. The ledger-plate bar can be removed without mechanical skill and replaced by any person however ignorant of machine construction.

What is claimed is:—

1. A cutter bar for harvesting machines comprising a finger-plate, guard fingers attached thereto each having a transverse slot, the forward end of said slot having an undercut recess and the floor thereof being provided with a transverse groove, and a forwardly projecting recess communicating therewith, a bar fitted into the grooves and having forwardly projecting lugs fitted into the forwardly projecting recesses of all the guard fingers, and ledger plates fastened to said bar above said lugs and having their forward ends beveled to fit the undercut recesses.

2. A cutter bar for harvesting machines comprising a finger-plate, guard fingers attached thereto each having a transverse slot, the forward end of said slot having an undercut recess and the floor thereof provided with a transverse groove and a forwardly projecting recess communicating therewith, a rib projecting above the floor of the slot at the rear of said groove, a bar fitted into the grooves and having forwardly projecting lugs fitted into the forwardly projecting recesses of all the guard fingers, and ledger-plates fastened to said bar above said lugs and having their forward ends beveled to fit the undercut recesses, and means at each end of the cutter bar for holding the ledger-plate bar in position.

3. A cutter bar for harvesting machines comprising a finger plate, guard fingers attached thereto each having a transverse slot, said slot having an undercut recess at its forward end and extending entirely across the guard finger, a transverse groove in the floor of the slot, and a forwardly projecting recess in the center line of the guard finger communicating therewith, a rib on the guard finger at the rear of said slot, a bar fitted into the grooves and having forwardly projecting lugs fitting into the forwardly projecting recesses, and ledger-plates having their forward ends beveled, and fastened to said bar above said lugs.

4. A cutter bar for harvesting machines comprising a finger plate, guard fingers attached thereto each having a transverse slot, a removable bar having spaced forwardly projecting lugs, ledger-plates fastened to the bar and lugs, said bar and ledger-plates adapted to be inserted in the transverse slots of the guard fingers, and a spring pin connection at each end of the cutter bar for fastening said ledger-bar thereto.

In testimony that I claim the foregoing as my own, I have hereto affixed my signature in the presence of two witnesses.

OSCAR C. TURNER.

Witnesses:
J. E. TORBETT,
FRANCES COSTELLO.